Aug. 20, 1935. H. H. WHEELER Re. 19,677

TURRET INDEX AND SUCTION CONTROL FOR CIGAR MACHINES

Original Filed Feb. 21, 1933 3 Sheets-Sheet 1

INVENTOR
Henry H. Wheeler
BY
Sydney B. Rescott
ATTORNEY

TURRET INDEX AND SUCTION CONTROL FOR CIGAR MACHINES

Original Filed Feb. 21, 1933 3 Sheets-Sheet 2

INVENTOR
Henry H. Wheeler
BY
Sydney J. Prescott
ATTORNEY

TURRET INDEX AND SUCTION CONTROL FOR CIGAR MACHINES

Original Filed Feb. 21, 1933 3 Sheets-Sheet 3

INVENTOR
Henry H. Wheeler
BY
Sydney A. Prescott
ATTORNEY

Reissued Aug. 20, 1935 Re. 19,677

UNITED STATES PATENT OFFICE 19,677

TURRET INDEX AND SUCTION CONTROL FOR CIGAR MACHINES

Henry H. Wheeler, Brooklyn, N. Y., assignor to International Cigar Machinery Company, a corporation of New Jersey Original No. 1,981,486, dated November 20, 1934, Serial No. 657,847, February 21, 1933. Application for reissue June 7, 1935, Serial No. 25,497

14 Claims. (Cl. 131—49)

This invention relates to cigar machines equipped with a turret carrying two wrapper cutting-dies for high-speed wrapper serving, its main object being to provide a simple, positively locking indexing device having a low ratio of maximum to minimum velocity of motion, thereby insuring smooth running of the turret at high speed.

In duplex-die cigar machines, such as disclosed in Patent No. 1,888,788, granted Nov. 22, 1932, to S. Clausen, the die turret turns one-half revolution after a leaf section is laid on one wrapper cutting-die, each wrapper being cut from the leaf on the cutting-die while the latter is in transit and then picked up by the suction head of the wrapper carrier while the next leaf is being served by the operator. With the present invention the wrapper is cut while the die turret is stationary; accordingly, a further object of this invention is the production of a novel device operating to advance the tobacco leaf from leaf serving to wrapper cutting position and cut the wrapper therefrom while it is stationary.

Each die is mounted on a leaf supporting suction bed on which the leaf section is held by suction while being carried by the turret to wrapper cutting position, where the wrapper is cut and transferred from the die by being lifted to the carrier head and then held by suction to the latter during its transfer to the wrapper-applying device in which it is wound on the cigar bunch. For the purpose of effecting the various suction conditions, the intermittently rotating turret table and its stationary support frame are provided with axial ports so that the motion of the turret produces the different port combinations required, and the suction is further controlled by a cam-operated slide valve. Therefore, a further object of the invention is to provide novel suction means.

Indexing devices heretofore employed to impart the intermittent motion of the die turret, due to the nature of the mechanism used, had the disadvantage of running at a comparatively high speed during a portion of each revolution, thereby producing a more or less jerky motion of the turret, and impairing the proper action of the indexing mechanism. The present turret index overcomes this objection, having a much more even motion throughout its cycle, resulting in much smoother running of the turret. This is accomplished by mounting on the turret shaft a disk carrying two diametrically opposite rollers, these rollers engaging with the divided track of a cam rotated by suitable gearing from the main shaft of the cigar machine. During each revolution of this cam, the divided track causes a reversal in the position of the said rollers, thereby producing a half turn of the turret shaft. With these and other objects not specifically mentioned in view, the invention consists in certain constructions and combinations hereinafter fully described and then specifically set forth in the claims hereunto appended.

In the accompanying drawings which form a part of this specification and in which like characters of reference indicate the same or like parts:

Figure 1:
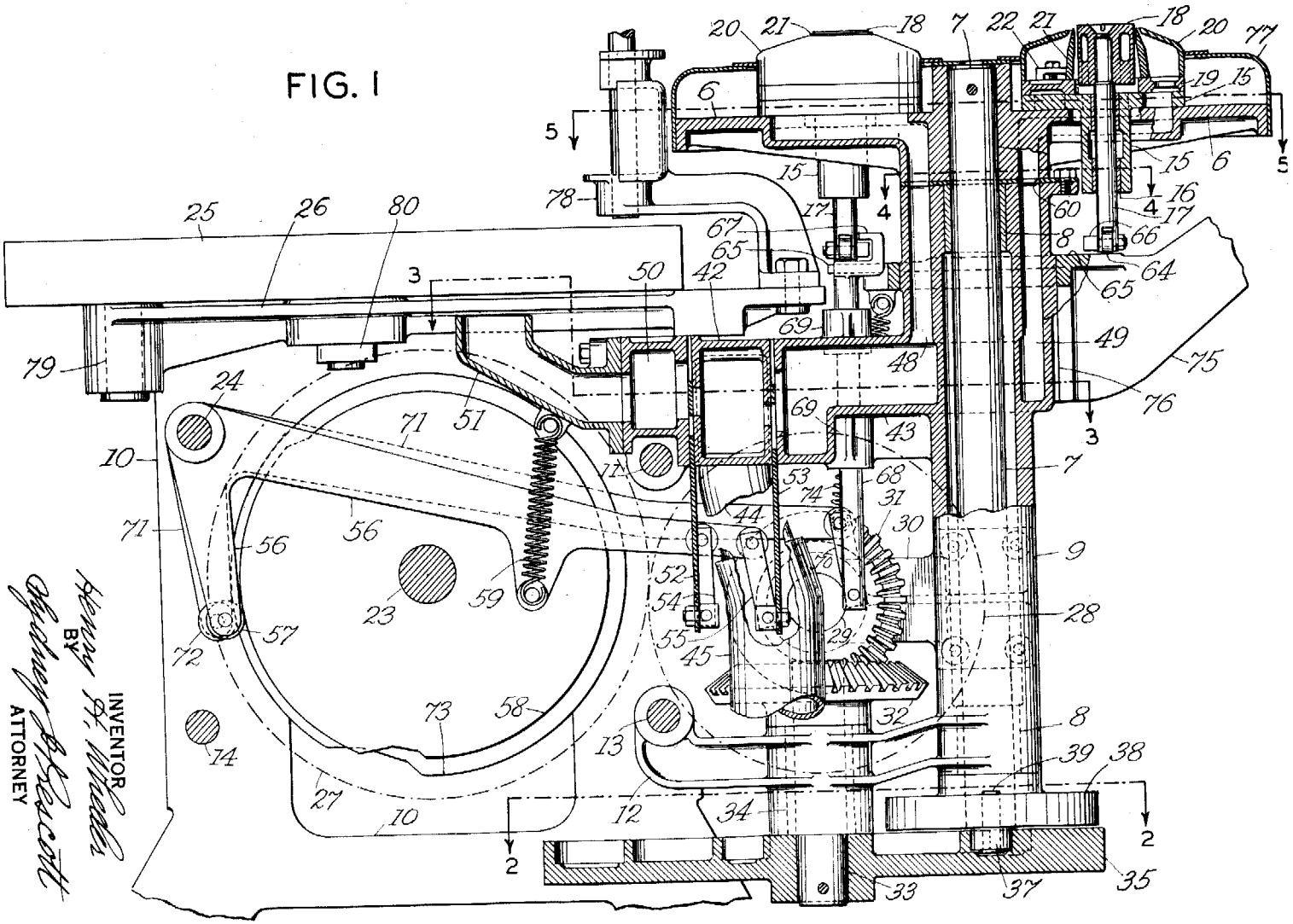
Fig. 1 is a sectional end elevation showing a die turret of a high speed cigar machine equipped with the improved indexing device and suction control.

In carrying the invention into effect there is provided a rotatable carrier, two leaf supporting suction beds mounted in diametrically opposite positions on said carrier, each bed having a wrapper cutting die thereon, means for intermittently rotating said carrier in 180 degree steps to carry each suction bed successively from leaf serving to wrapper cutting position, a cutting roller adapted to coact with the cutting die of the suction bed while it is at wrapper cutting position to cut a wrapper from a leaf thereon and mechanism for moving said roller over the cutting die of the suction bed at wrapper cutting position to cut a wrapper from a leaf thereon while the carrier is at rest. In the best forms of construction contemplated said means includes a shaft on which the carrier is mounted, a disk on said shaft provided with two rollers on its outer face at diametrically opposite points thereof, a rotatable cam provided with a circular cam track receiving both of said rollers to lock said shaft against rotation, said track being provided with a non-circular portion, and said cam having a by-pass connecting opposite portions of said track and adapted to receive one of said rollers while the other roller is engaged by a non-circular portion of the track, and mechanism for continuously rotating said cam to successively cause each of said rollers to enter the non-circular portion of said track and rotate said shaft one half-turn. In the best forms of construction there is also provided suction means controlled by the rotation of said carrier and connected to said beds for holding a leaf thereon and releasing the cut wrapper while each suction bed dwells at wrapper cutting position, and including a cam-operated slide valve actuated independently of the movement of said carrier. These various means and parts may be widely varied in construction within the scope of the claims, for the particular device selected to illustrate the invention is but one of many possible concrete embodiments of the same. The invention, therefore, is not to be restricted to the specific construction shown and described.

Referring to the drawings, the turret head or carrier 6 is mounted on a shaft 7 turnable in bearings 8 of a support frame 9 having suction connections, hereinafter described, supported from the upper part of main frame 10 of the cigar machine by a tie bolt 11, and having a bracket 12 near its bottom secured to a tie bolt 13 of frame 10, the latter also having a tie bolt 14 symmetrical with bolt 13. At diametrically opposite points of the carrier 6 are mounted two leaf supporting suction beds consisting of die holders 15 in bearings 16 of which are slidably mounted rods 17 supporting the hollow die blocks 18 which loosely fit into plates 19 fastened to the holders 15 and supporting the die shells 20. To each plate 19 is attached a wrapper cutting die 21 held thereon by clamps 22.

The frame 10 of the cigar machine supports the main shaft 23 and the fulcrum shaft 24, and carries the table plate 25 on which is pivoted an arm 26 carrying the cutting roller unit 78 which cuts the wrapper on the rearward die shown in outline in Fig. 1, while the operator serves the forward die shown in cross section, at standstill of the turret.

A gear 27 mounted on shaft 23 drives a gear 28 on a shaft 29 supported by a bracket 30 on the turret frame 9. Shaft 29 has a bevel gear 31 meshing with a bevel gear 32 on a shaft 33 journaled in a bearing 34 of turret frame 9. To the lower end of shaft 33 is affixed a cam 35 engaging with rollers 36 and 37 carried by a disk 38 attached to turret shaft 7.

Figure 2:
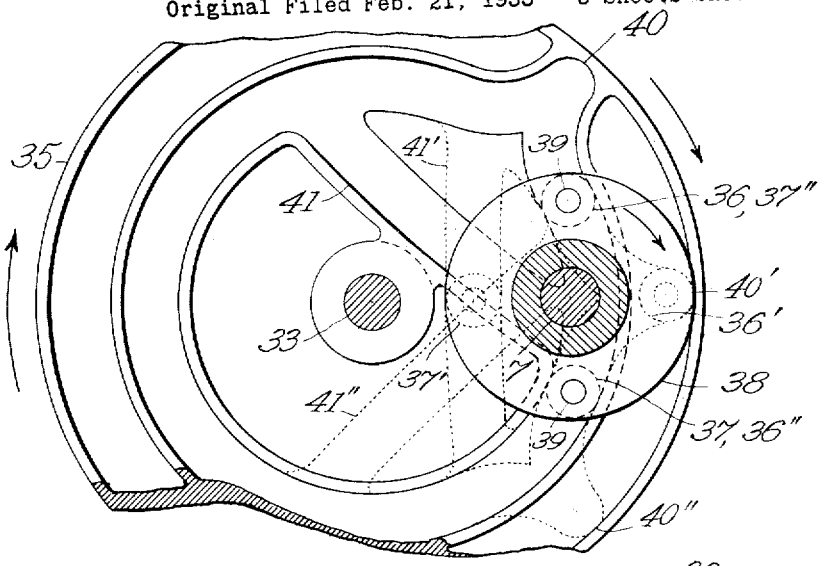
Fig. 2 is a detail sectional view taken on line 2—2 of Fig. 1, showing the operation of the turret index.

The rollers 36 and 37, Fig. 2, are mounted on studs 39 carried at diametrically opposite points by the disk 38. The cam track of cam 35 is circular except at one portion 40 at which it extends outwardly for a distance equal to half the distance between the rollers 36 and 37 less the height of an arc formed by the roller distance on the pitch circle of cam track 35, the maximum displacement of the non-circular portion of the cam track being equal to the displacement of the roller center from said pitch circle when either roller enters the non-circular portion of the cam track. Perpendicular to the radius at the outgoing point 40 and at a center-distance from that point equal to the distance between the rollers 36 and 37, a by-pass 41 extends across the cam from one side of the circular track to the other. In position 40 of the cam, shown in full lines in Fig. 2, the rollers 36 and 37 are both in the circular track, roller 36 being in the rear and roller 37 in the front, thereby locking the turret shaft against rotation. In position 40′, shown in dotted lines, the roller 36 by the clockwise advance of point 40 has been carried into position 36′ and the roller 37 has been forced to enter and travel along by-pass 41, now in position 41′, thereby turning the disk 38 through one-quarter of a revolution in the clockwise direction. In position 40″ of the cam, the roller 36 is in position 36″ prevously occupied by roller 37 and roller 37 has emerged by by-pass 41, now in position 41″, and is in position 37″ formerly occupied by roller 36, so that now their positions are exactly reversed, that is, the disk 38 has turned through 180 degrees resulting in a half-turn of turret shaft 7. Thereupon the engagement of the rollers 36 and 37 in the circular portion of the cam track holds the turret shaft locked until the portion 40 of the cam returns to engage the roller 37 and rotate the turret shaft another half-turn. In this manner the turret is intermittently rotated in 180 degree steps.

Figure 3:
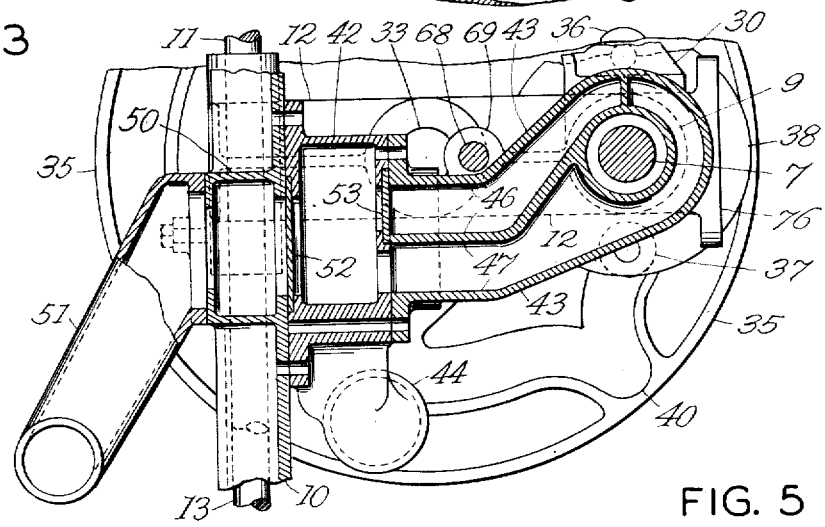
Fig. 3 is a horizontal cross-section on the line 3—3 of Fig. 1, showing the suction ports in the turret support.
Figure 4:
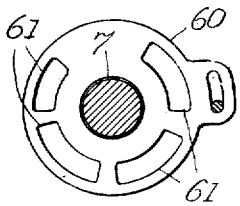
Fig. 4 is a detail view from line 4—4 of Fig. 1, showing a stationary suction distributing valve attached to the turret support.
Figure 5:
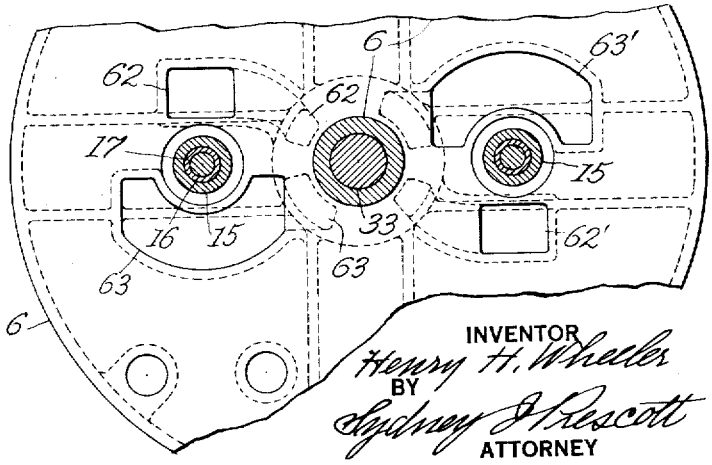
Fig. 5 is a detail view on line 5—5 of Fig. 1, showing the suction ports in the turret head.
Figures 6, 7:
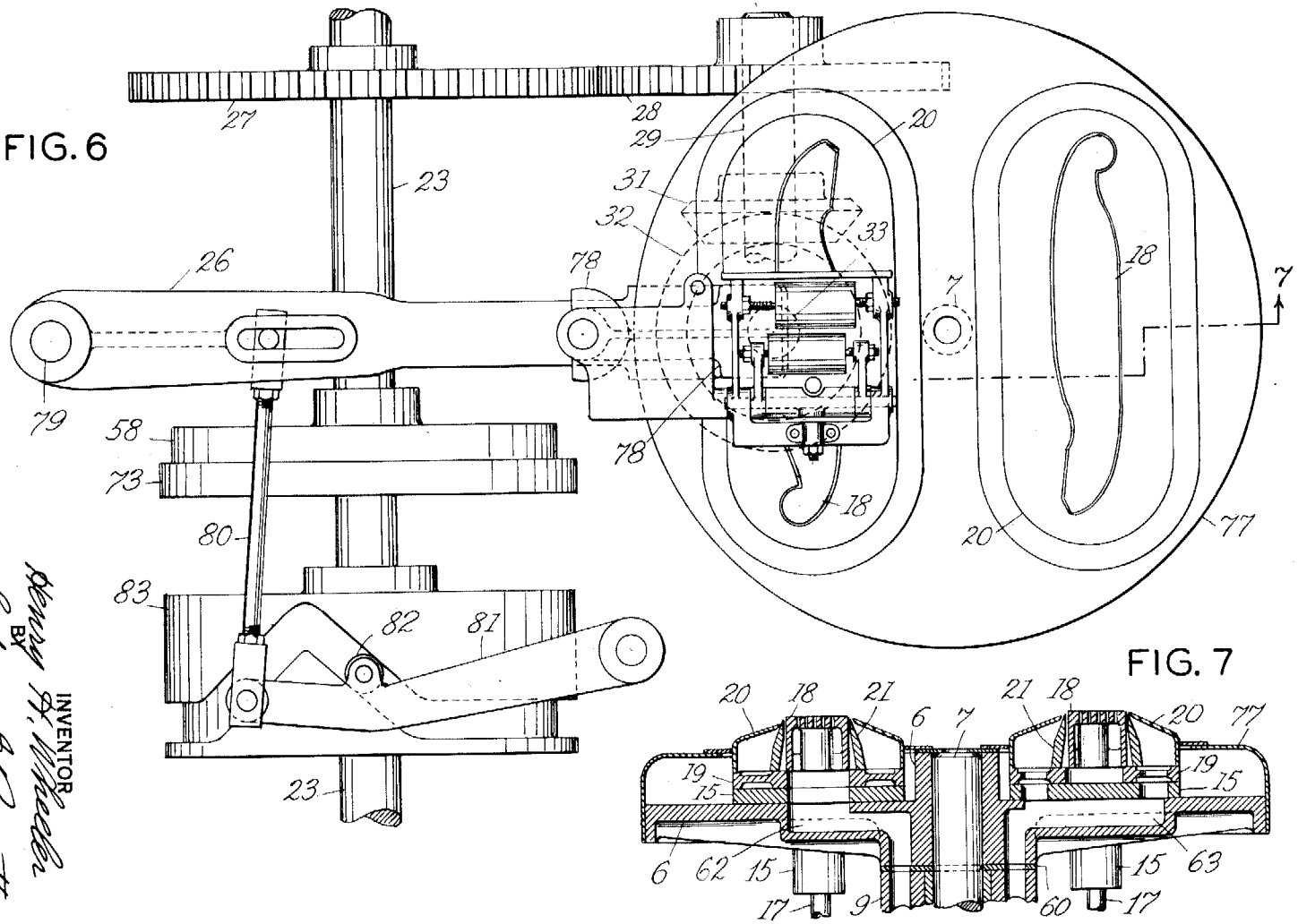
Fig. 6 is a plan view of Fig. 1.
Fig. 7 is a sectional view on the line 7—7 of Fig. 6 showing details of the leaf supporting suction heads.

The suction for holding the wrapper is supplied through a box 42 attached to chamber 43 of turret frame 9 and connected by a pipe outlet 44 to the hose connection 45 of the suction source (not shown). The chamber 43 has a vertical division wall, dividing it into two ducts 46 and 47, Fig. 3, each duct leading to one of the suction beds through the vertical ports 48 and 49, Fig. 1. From suction box 42, openings lead to the ducts 46 and 47 of chamber 43 and to a suction duct 50 in main frame 10, which communicates with a suction bracket 51 leading to the wrapper carrier, not shown, mounted on table plate 25. Between the suction box 42 and chamber 43 and duct 50 are inserted slide valves 52 and 53 designed to control the suction in the die blocks 18 and wrapper carrier, respectively, and connected by links 54 and 55 to a cam lever 56 fulcrumed on shaft 24 and having a roller 57 held in engagement with a cam 58 on shaft 23 by a spring 59 attached to bracket 51. The valve 53 controls the supply of suction to each suction bed when it carries a leaf section into wrapper cutting position, the valve 53 operating to cut off the supply of suction to the die block to release the cut wrapper thereon while the suction bed dwells in wrapper cutting position, through means presently described. Between the stationary frame 9 and the turret head 6, attached fixedly to the former, is inserted a disk valve 60 having a number of port openings 61, Fig. 4, communicating with the ports 48 and 49 in the frame 9. The turret head 6 has two pairs of ducts 62, 63, and 62′, 63′, Fig. 5. The ducts 62 and 62′ communicating with the interior of the die blocks 18, and the ducts 63 and 63′ communicating with the interior of the die shells 20 of the two suction beds through ports in the holders 15 and in support plates 19. To hold the leaf sections on the suction beds after they are laid thereon, the die blocks and shells are provided with holes communicating with their interiors. The rotation of the turret head 6 against the stationary valve 60, in conjunction with the timed action of valves 52 and 53, produces all the different suction conditions required at different stages for the proper operation of the mechanism, the port openings in valve 60 being arranged to register with the ducts 62, 62′ and 63, 63′ for full suction hold on the leaf section from the time the suction bed leaves the leaf serving position until after the wrapper is cut. While the turret dwells in the wrapper cutting position the suction in the die block is cut off by the valve 53 to release the cut wrapper so that it may be transferred to the wrapper carrier, but the suction within the die shell is maintained until shortly before the die returns to leaf serving position whereupon the operator removes the wrapper scrap before laying another leaf section on the suction bed.

The die block support rods 17 on their lower ends carry rollers 64 by which they rest on a circular cam surface 65 surrounding the turret frame 9. This cam surface raises the die blocks above the wrapper cutting die 21 in the leaf serving position to protect the operator's fingers, and causes the die blocks to descend slightly below the cutting edge of the die in the cutting position to ensure a sharp and clean cut when the cutting roller unit moves over the die. While the suction bed is moving into wrapper cutting position, an extension 66 of the studs of rollers 64 engages with a pocket 67 at the upper end of a rod 68 slidably supported in lugs 69 extending from turret frame chamber 43. The rod 68 is connected by a link 70 with cam lever 71 fulcrumed on shaft 24 and carrying a roller 72 held against the surface of a cam 73 on shaft 23 by a spring 74 fastened to a lug of cam 65. As the cam roller 72 engages with the low point of the cam 73 at the proper time, the rod 68 ascends, raising the die block 18 into engagement with the suction head of the wrapper carrier (not shown). The cam surface 65 is part of a bracket 75 attached to a pad 76 on turret frame 9 and supporting a die-serving table (not shown) abutting the housing 77 of the turret.

The cutting roller unit 78 is mounted on arm 26 which turns on a stud 79 attached to table 25 and is operated in synchronism with turret shaft 7 by a rod 80 connected to a lever 81 provided with a cam roller 82 engaging with a drum cam 83 on shaft 23. By performing the wrapper cutting operation by movable rollers while the turret stands still, the advantage is gained that a much greater portion of the turret cycle can be utilized for the cutting operation than when cutting the wrappers by stationary rollers during the motion of the turret, the ratio of dwelling to motion time with the present index being 2 to 1. The slower cutting motion prevents possible sliding of the wrapper on the die and reduces wear of the dies, promoting longer life of the same.

What is claimed is:

1. In a cigar machine, the combination with a rotatable carrier, of two leaf supporting suction beds mounted in diametrically opposite positions on said carrier, each bed having a wrapper cutting die thereon, means for intermittently rotating said carrier in 180 degree steps to carry each suction bed successively from leaf serving to wrapper cutting position, a cutting roller adapted to coact with the cutting die of each suction bed while it is at wrapper cutting position to cut a wrapper from a leaf thereon, and mechanism for moving said roller over the cutting die of the suction bed at wrapper cutting position to cut a wrapper from a leaf thereon while said carrier is at rest.

2. In a cigar machine, the combination with a rotatable carrier, of two leaf supporting suction beds mounted in diametrically opposite positions on said carrier, each bed having a wrapper cutting die thereon, means for intermittently rotating said carrier in 180 degree steps to carry each suction bed successively from leaf serving to wrapper cutting position, a cutting roller adapted to coact with the cutting die of each suction bed while it is at wrapper cutting position to cut a wrapper from a leaf thereon, and mechanism for moving said roller over the cutting die of the suction bed at wrapper cutting position to cut a wrapper from a leaf thereon while said carrier is at rest, said means including a shaft on which said carrier is mounted, a disk on said shaft provided with two rollers mounted on its outer face at diametrically opposite points thereof, a rotatable cam provided with a circular cam track receiving both of said rollers to lock said shaft against rotation, said track being provided with a non-circular portion, and said cam having a by-pass connecting opposite portions of said track and adapted to receive one of said rollers while the other roller is engaged by the non-circular portion of the track, and mechanism for continuously rotating said cam to successively cause each of said rollers to enter the non-circular portion of the said track and rotate said shaft one half-turn.

3. In a cigar machine, the combination with a rotatable carrier, of two leaf supporting suction beds mounted in diametrically opposite positions on said carrier, each bed having a wrapper cutting die thereon, means for intermittently rotating said carrier in 180 degree steps to carry each suction bed successively from leaf serving to wrapper cutting position, a cutting roller adapted to coact with the cutting die of each suction bed while it is at wrapper cutting position to cut a wrapper from a leaf thereon, mechanism for moving said roller over the cutting die of the suction bed at wrapper cutting position to cut a wrapper from a leaf thereon while said carrier is at rest, and suction means controlled by the rotation of said carrier and connected to said beds for holding a leaf thereon and releasing the cut wrapper while each suction bed dwells at wrapper cutting position.

4. In a cigar machine, the combination with a rotatable carrier, of two leaf supporting suction beds mounted in diametrically opposite positions on said carrier, each bed having a wrapper cutting die thereon, means for intermittently rotating said carrier in 180 degree steps to carry each suction bed successively from leaf serving to wrapper cutting position, a cutting roller adapted to coact with the cutting die of each suction bed while it is at wrapper cutting position to cut a wrapper from a leaf thereon, mechanism for moving said roller over the cutting die of the suction bed at wrapper cutting position to cut a wrapper from a leaf thereon while said carrier is at rest, and suction means controlled by the rotation of said carrier and connected to said beds for holding a leaf thereon and releasing the cut wrapper while each suction bed dwells at wrapper cutting position, said suction means including a cam-operated slide valve actuated independently of the movement of said carrier.

5. The combination with a rotatable carrier, of two leaf supporting suction beds mounted in diametrically opposite positions on said carrier each bed having a wrapper cutting die thereon, and means for intermittently rotating said carrier in 180 degree steps, said means including a shaft on which said carrier is mounted, a disk on said shaft provided with two rollers mounted on its outer face at diametrically opposite points thereof, a rotatable cam provided with a circular cam track receiving both of said rollers to lock said shaft against rotation, said track being provided with a non-circular portion, and said cam having a by-pass connecting opposite portions of said track and adapted to receive one of said rollers while the other is engaged by the non-circular portion of the track, and mechanism for continuously rotating said cam to successively cause each of said rollers to enter the non-circular portion of said track and rotate said shaft one half-turn.

6. The combination with a rotatable carrier, of means for intermittently rotating said carrier in 180 degree steps, said means including a shaft on which said carrier is mounted, a disk on said shaft provided with two rollers mounted on its outer face at diametrically opposite points thereof, a rotatable cam provided with a circular cam track receiving both of said rollers to lock said shaft against rotation, said track being provided with a non-circular portion, and said cam having a by-pass connecting opposite portions of said track and adapted to receive one of said rollers while the other is engaged by the non-circular portion of the track, and mechanism for continuously rotating said cam to successively cause each of said rollers to enter the non-circular portion of said track and rotate said shaft one half-turn.

7. In combination with a shaft, a disk on said shaft provided with two rollers mounted on its outer face at diametrically opposite points thereof, a rotatable cam provided with a circular cam track receiving both of said rollers to lock the shaft against rotation, said track being provided with a non-circular portion and said cam having a by-pass connecting opposite portions of said track and adapted to receive one of said rollers while the other is engaged by the non-circular portion of the track, and mechanism for continuously rotating said cam to successively cause each of said rollers to enter the non-circular portion of said track and rotate said shaft one half-turn.

8. In a cigar machine, the combination with a rotatable carrier, of a plurality of leaf supporting suction beds mounted on said carrier, each bed having a wrapper cutting die thereon, means for intermittently rotating said carrier to carry each suction bed from leaf serving to wrapper cutting position, a cutting roller adapted to coact with the cutting die of each suction bed while it is at wrapper cutting position to cut a wrapper from a leaf thereon, and mechanism for moving said roller over the cutting die of the suction bed at wrapper cutting position to cut a wrapper from a leaf thereon while said carrier is at rest.

9. In a cigar machine, the combination with a rotatable carrier, of a plurality of leaf supporting suction beds mounted on said carrier, each bed having a wrapper cutting die thereon, means for intermittently rotating said carrier to carry each suction bed from leaf serving to wrapper cutting position, a cutting roller adapted to coact with the cutting die of each suction bed while it is at wrapper cutting position to cut a wrapper from a leaf thereon, mechanism for moving said roller over the cutting die of the suction bed at wrapper cutting position to cut a wrapper from a leaf thereon while said carrier is at rest, and suction means controlled by the rotation of said carrier and connected to said beds for holding a leaf thereon and releasing the cut wrapper while each suction bed dwells at wrapper cutting position.

10. In a cigar machine, the combination with a rotatable carrier, of a plurality of leaf supporting suction beds mounted on said carrier, each bed having a wrapper cutting die thereon, means for intermittently rotating said carrier to carry each suction bed from leaf serving to wrapper cutting position, a cutting roller adapted to coact with the cutting die of each suction bed while it is at wrapper cutting position to cut a wrapper from a leaf thereon, mechanism for moving said roller over the cutting die of the suction bed at wrapper cutting position to cut a wrapper from a leaf thereon while said carrier is at rest, and suction means connected to said beds for holding a leaf thereon and releasing the cut wrapper while each suction bed dwells at wrapper cutting position, said suction means including a valve actuated independently of the movement of said carrier.

11. In a cigar machine, the combination with a rotatable carrier, of a plurality of leaf supporting suction beds mounted on said carrier, each bed having a wrapper cutting die thereon, means for intermittently rotating said carrier to carry each suction bed from leaf serving to wrapper cutting position, a cutting roller adapted to coact with the cutting die of each suction bed to cut a wrapper from a leaf thereon, and suction means connected to said beds for holding a leaf thereon and releasing the cut wrapper, said suction means including a valve actuated independently of the movement of said carrier throughout its operating cycle.

12. In a cigar machine, the combination with a rotatable carrier, of a plurality of leaf supporting suction beds mounted on said carrier, each bed having a wrapper cutting die thereon, means for intermittently rotating said carrier, a cutting roller adapted to coact with the cutting die of each suction bed to cut a wrapper from a leaf thereon, and suction means connected to said beds for holding a leaf thereon and releasing the cut wrapper while each suction bed dwells at wrapper cutting position, said suction means incluring a valve actuated independently of the movement of said carrier, and a second valve controlled by the rotation of the carrier.

13. In a cigar machine, the combination with a rotatable carrier, of a plurality of leaf supporting suction beds mounted on said carrier, each bed having a wrapper cutting die thereon, means for intermittently rotating said carrier to carry each suction bed from leaf serving to wrapper cutting position, a cutting roller adapted to coact with the cutting die of each suction bed to cut a wrapper from a leaf thereon, said means including a rotatable driven index member in constant driving relationship to said carrier, and a continuously rotating driving index member acting on said driven member to rotate the same step by step, said driving and driven members having parts coacting to lock the driven member and associated carrier against rotation between steps.

14. In a cigar machine, the combination with a rotatable carrier, of a plurality of leaf supporting suction beds mounted on said carrier, each bed having a wrapper cutting die thereon, means for intermittently rotating said carrier to carry each suction bed from leaf serving to wrapper cutting position, a cutting roller adapted to coact with the cutting die of each suction bed to cut a wrapper from a leaf thereon, said means including a rotatable driven index member in constant driving relationship to said carrier, a continuously rotating driving index member acting on said driven member to rotate the same step by step, said driving and driven members having parts coacting to lock the driven member and associated carrier against rotation between steps, and a shaft on which said carrier is mounted, said driven index member being fixed to said shaft.

HENRY H. WHEELER.